United States Patent
Sano

(10) Patent No.: US 10,212,405 B2
(45) Date of Patent: Feb. 19, 2019

(54) CONTROL APPARATUS AND METHOD

(71) Applicant: CANON KABUSHIKI KAISHA, Tokyo (JP)

(72) Inventor: Akira Sano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 15/222,420

(22) Filed: Jul. 28, 2016

(65) Prior Publication Data
US 2017/0034492 A1 Feb. 2, 2017

(30) Foreign Application Priority Data

Jul. 29, 2015 (JP) .................. 2015-149810

(51) Int. Cl.
| | |
|---|---|
| *H04N 9/31* | (2006.01) |
| *H04N 1/32* | (2006.01) |
| *H04N 5/235* | (2006.01) |
| *G06T 5/50* | (2006.01) |

(52) U.S. Cl.
CPC ....... *H04N 9/3191* (2013.01); *H04N 1/32352* (2013.01); *H04N 5/2353* (2013.01); *H04N 9/3185* (2013.01); *G06T 5/50* (2013.01)

(58) Field of Classification Search
CPC . H04N 9/3191; H04N 1/32352; H04N 5/2353
USPC ........................................ 348/177, 189, 136
See application file for complete search history.

(56) References Cited

U.S. PATENT DOCUMENTS

| | | | |
|---|---|---|---|
| 7,907,795 B2 | 3/2011 | Hardy et al. | |
| 2010/0110180 A1* | 5/2010 | Tonogai | G06T 5/50 |
| | | | 348/136 |
| 2013/0141569 A1 | 6/2013 | Ikeda | |
| 2014/0176730 A1* | 6/2014 | Kaji | H04N 9/3185 |
| | | | 348/189 |

FOREIGN PATENT DOCUMENTS

| | | |
|---|---|---|
| JP | 2013-090109 A | 5/2013 |
| WO | 2013/094347 A1 | 6/2013 |

OTHER PUBLICATIONS

Search report issued in corresponding application No. GB1613043.7 dated Jan. 31, 2017.

* cited by examiner

*Primary Examiner* — Jefferey F Harold
*Assistant Examiner* — Omer Khalid
(74) *Attorney, Agent, or Firm* — Carter, DeLuca, Farrell & Schmidt, LLP

(57) ABSTRACT

A control apparatus acquires information concerning an update timing of a projection or display image, determines an image capturing timing by image capturing unit based on the information concerning the acquired update timing and an exposure period by the image capturing unit which captures a projection or display image, and controls a projection or display image based on a pattern image extracted from a captured image obtained by image capturing by the image capturing unit at the determined image capturing timing.

14 Claims, 7 Drawing Sheets

CONTROL APPARATUS AND METHOD

BACKGROUND OF THE INVENTION

Field of the Invention

The present invention relates to a control apparatus and a control method of controlling a display apparatus.

Description of the Related Art

Recently, a projection system using one or a plurality of projection apparatuses is being installed in, for example, amusement facilities, museums, and the like. Such a projection system sometimes captures an image of a calibration pattern projected from a projection apparatus by using a camera and corrects a projected shape and the image quality of a projection image on a screen based on the captured image. For the purpose of copyright protection, information which cannot be perceived by human visual sense is sometimes embedded in a content as an electronic watermark, which is detected from an image captured by the camera.

When capturing a projection image from a projection apparatus, to obtain a calibration pattern or electronic watermark, it is necessary to properly capture the displayed image. However, a projection apparatus updates a display by sequentially sending color and luminance signals corresponding to the dot matrix of the panel to the scanning destination and reflecting them in display. For this reason, even at the moment when a camera captures an image, the display is updated, and hence it is only a short period of time of a vertical blanking period during which a one-frame image is properly displayed. If image capturing is not complete within this blanking period, a one-frame image cannot be properly captured.

Conventionally, there is available a technique of embedding control data for controlling processing executed by using image data in a portion, of a video signal, in which no image is embedded (Japanese Patent Laid-Open No. 2013-090109 (hereinafter referred to as literature 1)). The technique disclosed in literature 1 can capture a one-frame display image by embedding projection control data and image capturing control data in a one-frame video signal.

The technique disclosed in literature 1 is designed to embed control data as part of image data. For this reason, except when a specific pattern image is displayed, it is possible that image data loss may occur. In addition, in order to capture a one-frame image, it is necessary to complete image capturing within a vertical blanking period, the exposure period at the time of image capturing shortens. As a result, a captured image may lack in brightness.

SUMMARY OF THE INVENTION

One embodiment of the present invention enables ensuring of an exposure period sufficient for capturing a projection or display image.

According to one aspect of the present invention, there is provided a control apparatus comprising: an acquisition unit configured to acquire information concerning an update timing of a projection or display image; a determination unit configured to determine an image capturing timing by an image capturing unit based on the information concerning the update timing acquired by the acquisition unit and an exposure period by the image capturing unit for capturing the projection or display image; and a control unit configured to control a projection or display image based on a pattern image extracted from a captured image obtained by image capturing by the image capturing unit at an image capturing timing determined by the determination unit based on the information concerning the update timing acquired by the acquisition unit and the exposure period by the image capturing unit for capturing the projection or display image.

According to another aspect of the present invention, there is provided a method of controlling a projection or display apparatus comprising: acquiring information concerning an update timing of a projection or display image; determining an image capturing timing by an image capturing unit based on the information concerning the acquired update timing and an exposure period by the image capturing unit for capturing the projection or display image; and controlling a projection or display image based on a pattern image extracted from a captured image obtained by image capturing by the image capturing unit at the determined image capturing timing based on the information concerning the acquired update timing and the exposure period by the image capturing unit for capturing the projection or display image.

Further features of the present invention will become apparent from the following description of exemplary embodiments (with reference to the attached drawings).

DESCRIPTION OF THE EMBODIMENTS

A preferred embodiment of the present invention will be described below with reference to the accompanying drawings.

Figure 1:
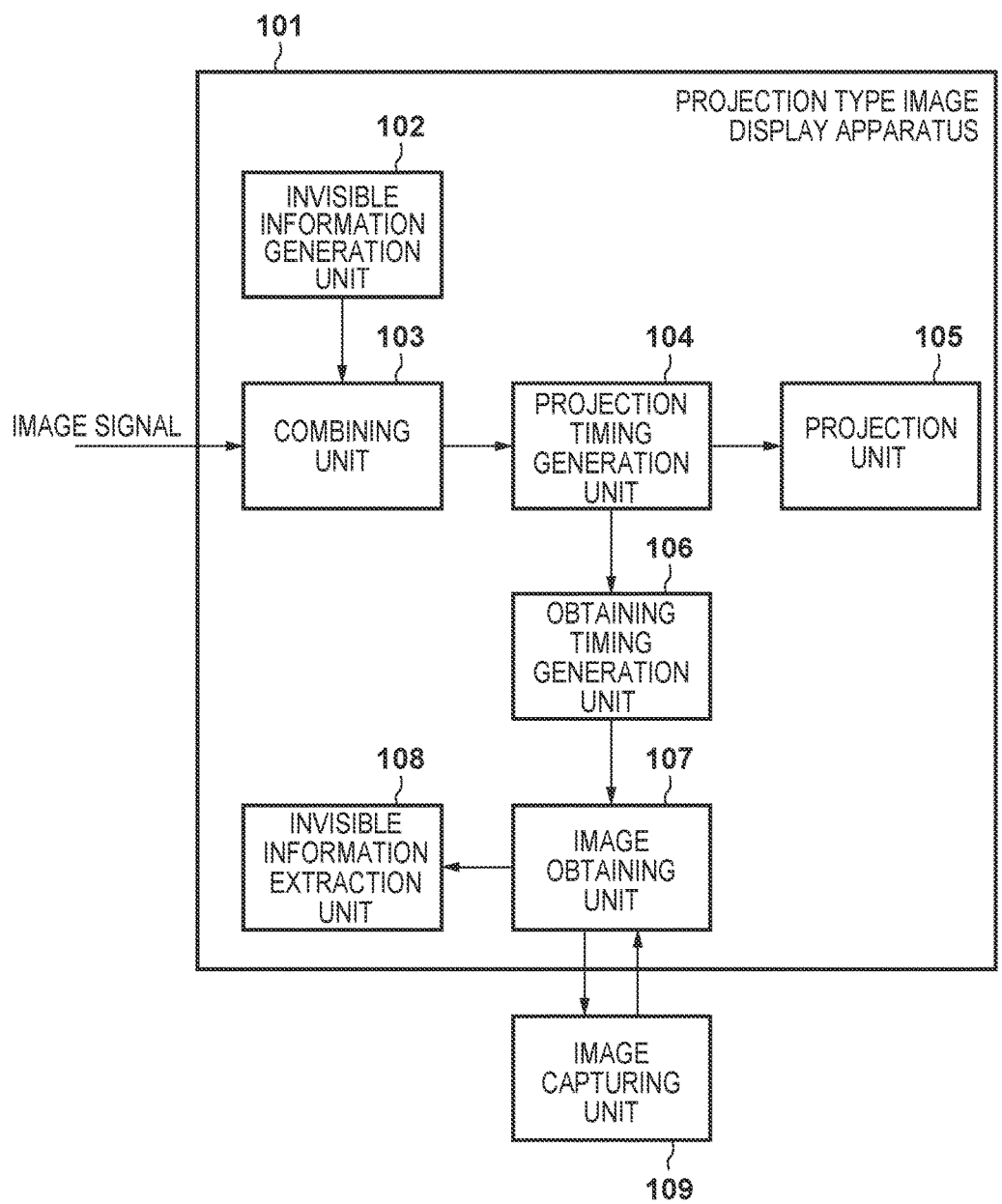
FIG. 1 is a block diagram showing the schematic arrangement of a projection apparatus according to an embodiment.

FIG. 1 is a block diagram showing an example of the arrangement of a projection type image display apparatus (to be referred to as a projection apparatus 101 hereinafter) according to this embodiment. An invisible information generation unit 102 generates invisible information to be combined with an image. In this case, invisible information is an image pattern difficult to be perceived by human visual sense, such as an electronic watermark indicating copyright information of a pattern image or image, which is obtained by, for example, coding two-dimensional coordinates (position) of the image. Note however that this embodiment places no limitation on invisible information generation algorithms. A combining unit 103 generates a projection image by combining a predetermined image (a pattern generated by the invisible information generation unit 102 in the embodiment) and a projection target image. Note that the combining unit 103 combines a pattern obtained by coding the two-dimensional coordinate information of an image with a projection image by adding or subtraction.

A projection timing generation unit 104 generates a projection timing for projecting/displaying a projection image generated by the combining unit 103 on a display panel (projection screen) (not shown). A projection timing is a control signal necessary for video display. A projection timing includes, for example, a horizontal synchronization signal as a switching timing for one line, a vertical synchronization signal as a switching timing for one screen (one frame), a blanking period as a pixel non-display period, and a dot clock at the pixel level to be displayed. A projection unit 105 projects a projection image as a display target on the display panel (projection screen) (not shown) through a projection lens based on the projection timing generated by the projection timing generation unit 104.

An obtaining timing generation unit 106 generates an obtaining timing for making an image obtaining unit 107 generate an image based on the projection timing generated by the projection timing generation unit 104 and the performance of the image obtaining unit 107. The generation of an obtaining timing will be described in detail later. The image obtaining unit 107 obtains image information (captured image) of an image projected by the projection unit 105 based on the obtaining timing generated by the obtaining timing generation unit 106. For example, the image obtaining unit 107 obtains image information by executing an image capturing operation using an image capturing unit 109 (camera) in accordance with an obtaining timing.

An invisible information extraction unit 108 extracts a pattern from a projection image included in a captured image obtained by the image obtaining unit 107, and extracts invisible information by further decoding the extracted pattern. In this embodiment, coordinate information is extracted as invisible information. The image capturing unit 109 performs an image capturing operation in accordance with an image capturing instruction (image obtaining instruction) from the image obtaining unit 107, and provides the obtained image to the image obtaining unit 107. Note that the image capturing unit 109 and the image obtaining unit 107 may be integrally formed.

Figure 2:
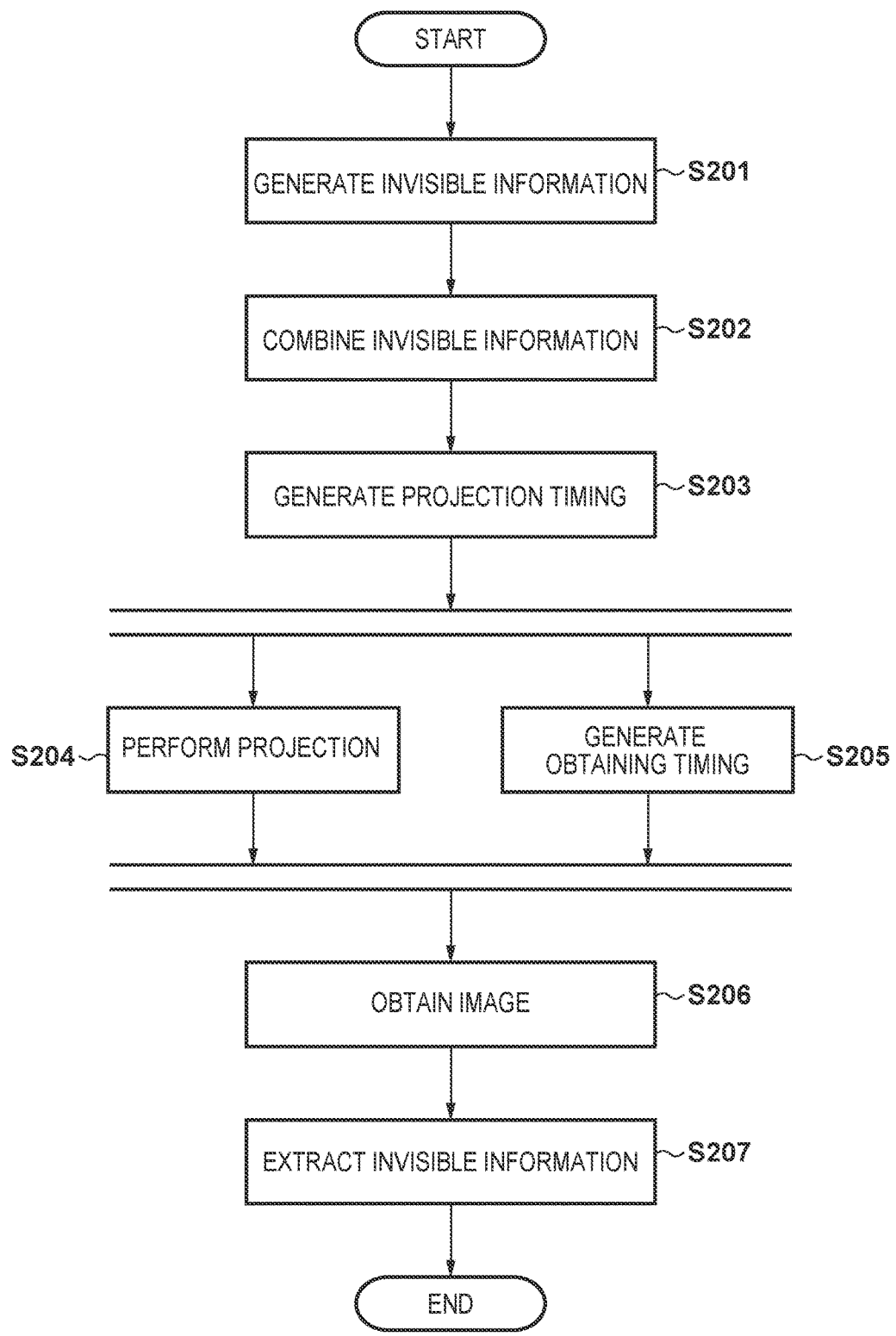
FIG. 2 is a flowchart showing processing by the projection apparatus according to the embodiment.
Figure 3:
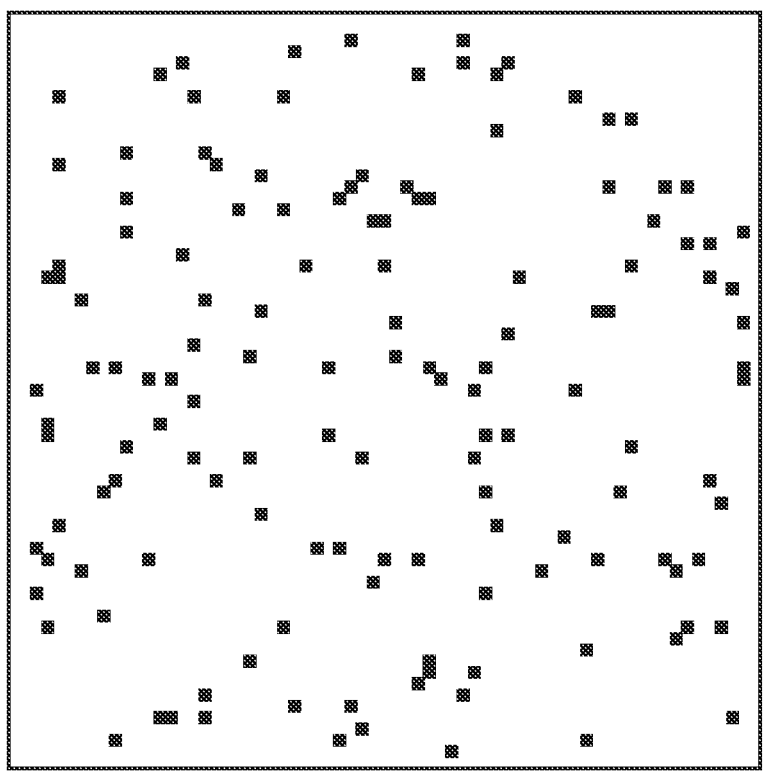
FIG. 3 is a view showing an example of a coded pattern of two-dimensional coordinates according to the embodiment.

The flowchart of FIG. 2 shows processing from the obtaining of a captured image on the display screen to the extraction of invisible information in the projection apparatus 101 having the above arrangement. In step S201, the invisible information generation unit 102 generates a pattern by coding the two-dimensional coordinates (positions) of an image. For example, when two-dimensional coordinates (positions) are coded by the technique disclosed in U.S. Pat. No. 7,907,795, the obtained pattern becomes a dot pattern like that shown in FIG. 3. In step S202, the combining unit 103 then generates a projection image by combining the dot pattern generated in step S201 with a projection target image.

In step S203, the projection timing generation unit 104 generates a projection timing. A projection timing is determined by the specifications of the projection unit 105. Assume that an image is displayed with a resolution of 4096×2160 at 120 frames/sec on the panel, with a horizontal blanking period and a vertical blanking period corresponding to 100 pixels and 100 lines respectively. In this case, a vertical synchronization signal, a horizontal synchronization signal, and a dot clock defining one frame can be defined as 120 Hz, 271 kHz, and 9.48 MHz, respectively. The projection timing generation unit 104 generates a projection timing signal including a vertical synchronization signal, a horizontal synchronization signal, and a dot clock at a timing based on the above definitions, and outputs the signal to the projection unit 105 and the obtaining timing generation unit 106.

Steps S204 and S205 described next are executed in parallel (substantially in parallel). In step S204, the projection unit 105 projects the projection image generated in step S202 on a projection plane based on the projection timing generated in step S203. Note that the dot pattern generated in step S201 allows its size, density, and concentration to be controlled. A dot pattern can be formed into an almost invisible pattern by setting the size, density, and concentration to small values in consideration of tradeoff with dot pattern extraction accuracy. In step S205, the obtaining timing generation unit 106 generates an obtaining timing for making the obtaining timing generation unit 106 capture a display screen based on the projection timing generated in step S203.

In step S206, the image obtaining unit 107 obtains an image by capturing a projection image by driving the image capturing unit 109 in accordance with the obtaining timing generated in step S205. In step S207, the invisible information extraction unit 108 extracts invisible information from an image (captured image) obtained in step S206.

Figure 4:
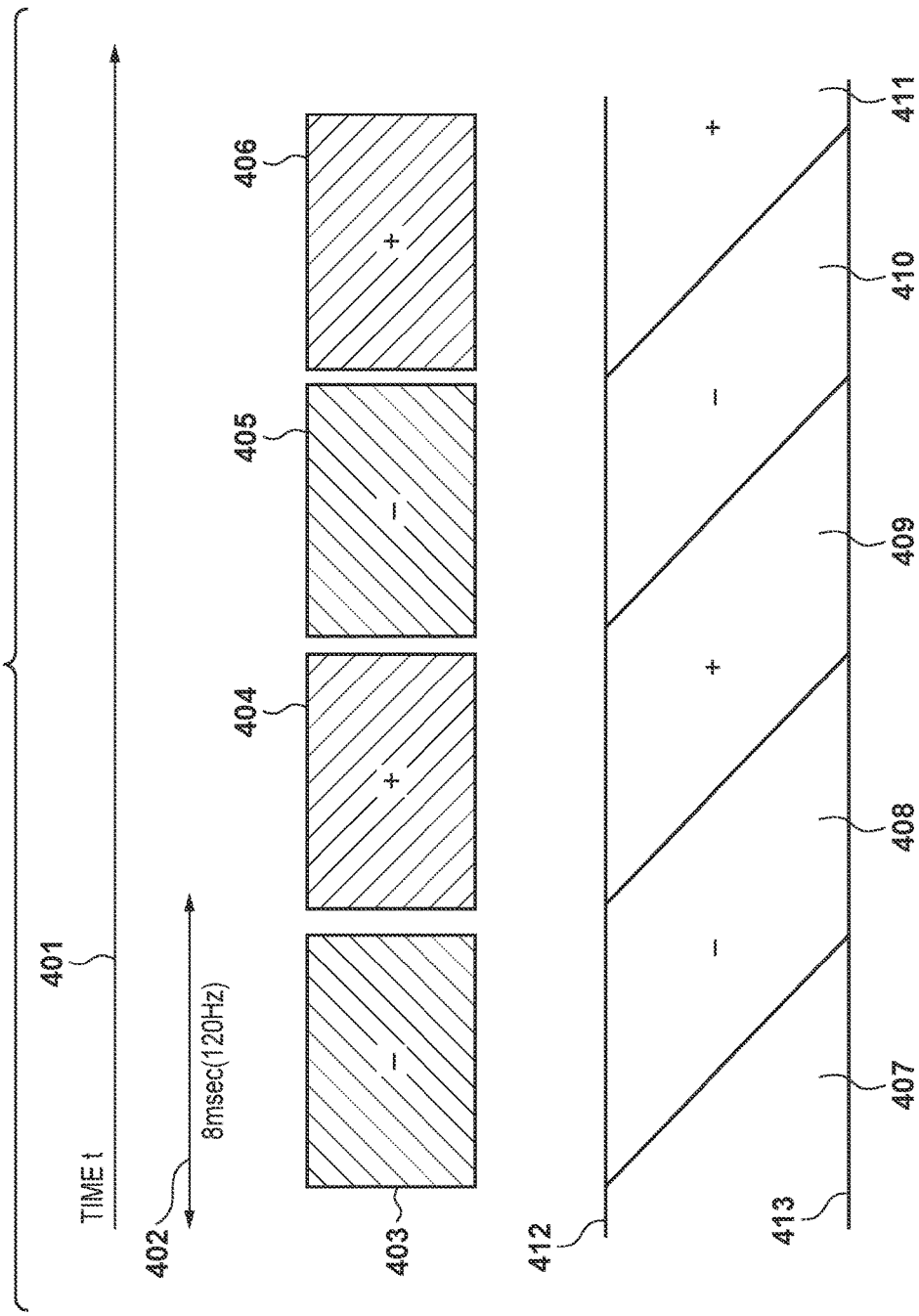
FIG. 4 is a view for explaining states of projection images and scan lines according to the embodiment.

Temporal changes in the states of a projection image projected in step S204 and a projection image on the projection plane (screen) will be described in detail with reference to FIG. 4. FIG. 4 is a schematic view for explaining the states of scan lines on the projection image and the projection plane. A time axis 401 indicates that the time advances rightward in FIG. 4. A period 402 indicates a time during which a one-frame image is displayed. The period of one frame is based on the intervals at which vertical synchronization signals are generated. In this embodiment, since one frame is updated at 120 Hz, a period during which each frame is displayed (the period of one frame) is about 8 ms (¹⁄₁₂₀ sec). Frames 403 to 406 indicate projection images. The notation "+" or "−" in a given frame indicates whether image combining has been performed by causing the combining unit 103 to add (+) or subtract (−) a pattern image generated by invisible information generation unit 102.

Scan lines on a projection plane respectively have display states 407 to 411, with the notations "+" and "−" being the same as those in the frames 403 to 406. The display state 407 indicates that a frame one frame before the frame 403. The display state 408 indicates that the display on the projection plane is updated to the projection image of the frame 403. Likewise, the display states 409, 410, and 411 respectively indicate that the displays of the images of the frames 404, 405, and 406 are updated on the projection plane. The display states 407 to 411 indicate that the display is sequentially updated for each line with the lapse of time from an uppermost line 412 to a lowermost line 413 of the projection image. That is, when a projection image on a projection plane is captured at an arbitrary timing T, the display (projection image) on the projection plane is kept updated even during the exposure period of image capturing.

Figure 5:
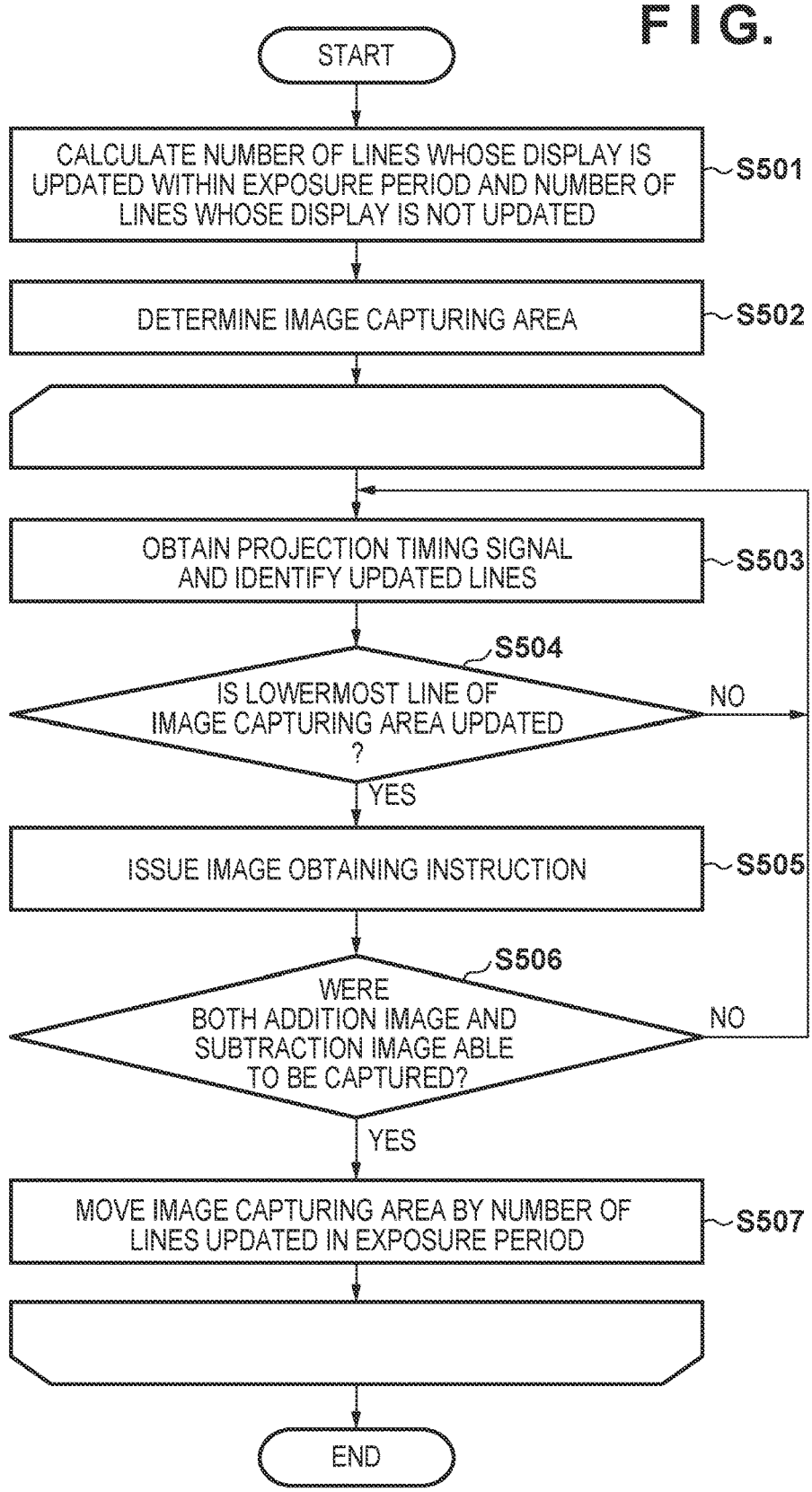
FIG. 5 is a flowchart showing the processing of generating an image obtaining instruction according to the embodiment.

The generation of an obtaining timing in step S205 will be described next. In this embodiment, the projection unit 105 generates an obtaining timing as an image capturing timing signal for making the image capturing unit 109 execute image capturing based on a synchronization signal for updating the display content of one frame of a projection image, portion by portion, and the exposure period of image capturing by the image capturing unit 109. Note that in the embodiment, a synchronization signal used for the generation of an obtaining timing is a horizontal synchronization signal for updating a display content for each line in one frame, and is generated by the projection timing generation unit 104. FIG. 5 is a flowchart for explaining an example of processing until an image capturing (image obtaining) instruction is issued to the image obtaining unit 107 based on a projection timing.

In step S501, the obtaining timing generation unit 106 calculates the number of lines subjected to display updating within the exposure period of the image capturing unit 109 and the number of lines not subjected to display updating within the exposure period. In this case, the exposure period is defined in advance by the performance of the image obtaining unit 107 (the image capturing unit 109). An exposure period is generally defined as a shutter speed, for example, from 1/8000 sec to 30 sec. In this embodiment, the shutter speed is 1/250 sec, that is, the exposure period is 4 ms. Letting HSync be the frequency of a horizontal synchronization signal and T be the time, the number of lines updated per time can be calculated by $$HSync \times T \qquad (1)$$

As described above, when the horizontal synchronization signal has a frequency of 271 kHz, 271,000 lines are updated per sec. That is, 1,084 lines are updated during the exposure period, that is, 4 ms. Since the effective period in the vertical direction corresponds to 2,160 lines, a display image corresponding to 1,084 lines from the start timing of image capturing is changed within the exposure period, and 1,076 lines obtained by subtracting the 1,084 from the 2,160 can be calculated as the number of lines which are not updated within the exposure period.

In step S502, the obtaining timing generation unit 106 determines the first image capturing area. In this case, an area from the upper end line of an entire projection plane to the line which is not updated during the exposure period and is calculated in step S502 (from 0th line to the 1,075th line in the vertical direction) is determined as an image capturing area. That is, an area from coordinates (0, 0) to coordinates (4095, 1075) of the display screen of 4096×2160 is an image capturing area. This image capturing area is an area, of a projection image included in a captured image, where a display content is not updated by a synchronization signal (horizontal synchronization signal) during the exposure period of the image capturing unit 109. The invisible information extraction unit 108 extracts a pattern from this image capturing area in the captured image obtained by the image capturing unit 109.

In step S503, the obtaining timing generation unit 106 obtains a horizontal synchronization signal and a vertical synchronization signal from the projection timing signal generated by the projection timing generation unit 104. In this case, it can be determined that the screen is updated by one line every time a horizontal synchronization signal is received. That is, after a vertical synchronization signal is obtained, the number of lines of the screen updated accompanying a horizontal synchronization signal can be identified by counting the number of obtained horizontal synchronization signals.

In step S504, the obtaining timing generation unit 106 determines whether the number of lines identified in step S503 indicates the lowermost line of the image capturing area determined in step S502. If the identified number of lines indicates the lowermost line of the image capturing area, that is, the lowermost line of the image capturing area is updated, the process advances to step S505 to issue an instruction to obtain an image. If the identified number of lines does not indicate the lowermost line of the image capturing area, the process returns to step S503 to wait for the notification of a projection timing signal again. In this manner, the projection unit 105 generates an obtaining timing in accordance with the counting of the number of synchronization signals (horizontal synchronization signals) corresponding to the difference time obtained by subtracting the exposure period from a one-frame period during which the projection unit 105 displays a one-frame image.

In step S505, the obtaining timing generation unit 106 outputs the obtained obtaining timing to the image obtaining unit 107 and issues an instruction to obtain an image. In step S506, the obtaining timing generation unit 106 determines whether image capturing areas in both an image obtained by adding the pattern image generated by the invisible information generation unit 102 and an image obtained by subtracting the pattern image have been captured. If areas in both the images have been able to be captured, the process advances to step S507. If an area in only one of the images has been able to be captured, the process returns to step S503. When the process returns to step S503, the obtaining timing generation unit 106 captures, in the next frame, the same image capturing area as that in the previous frame. In this manner, a captured image is obtained, which includes, for example, an image capturing area having, for example, the uppermost line 412 as the upper end in each of two consecutive frames, that is, the nth frame and the (n+1)th frame.

In step S507, the obtaining timing generation unit 106 moves an image capturing area by the number of lines not updated during the exposure period, and the process returns to step S503. Based on the image capturing area described with reference to step S502, the image capturing area set in step S507 is an area from coordinates (0, 1076) to coordinates (4095, 2151). For example, an obtaining timing is generated in accordance with the counting of synchronization signals (horizontal synchronization signals) corresponding to twice the above difference time. In this manner, with regard to the (n+2)th and (n+3)th frames, which are two consecutive frames following the nth and (n+1)th frames, captured images including image capturing areas after the movement are obtained. Upon obtaining captured images corresponding to one or more frames with regard to projection images obtained by adding and subtracting a pattern image, the process exits from the loop of steps S503 to S507.

Note that when image capturing areas astride the lowermost end of the panel, the image capturing areas are two areas, that is, the lower and upper areas of the panel. In the above case, when an image capturing area further moves, the coordinates of the image capturing area have changed from coordinates (0, 2152) to (4095, 2159), and from coordinates (0, 0) of the next frame to coordinates (4095, 967) in consideration of a vertical blanking period corresponding to 100 lines.

Figure 6:
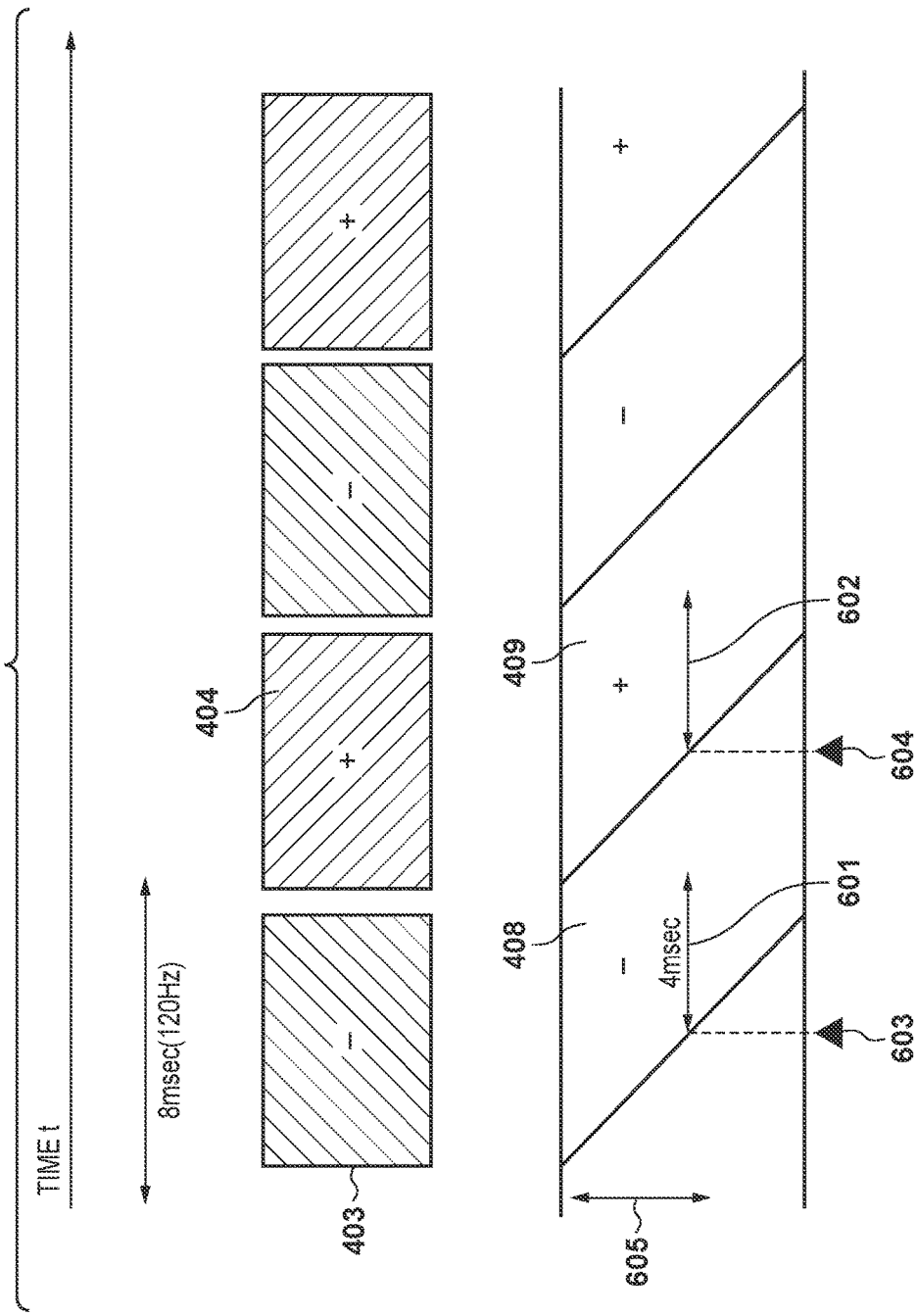
FIG. 6 is a conceptual view showing the relationship between an image obtaining timing and an exposure period for image capturing according to the embodiment.

FIG. 6 is a view obtained by adding the relationship between the timing of an image obtaining instruction output in step S505 and the exposure period of image capturing to the state of projection images and scan lines on a projection plane described with reference to FIG. 4. Note that the same reference numerals as those in FIG. 4 denote the same elements as those described with reference to FIG. 4.

Periods 601 and 602 indicate the periods of exposure by the image capturing unit 109. Timings 603 and 604 indicate the obtaining timings of images. A range 605 indicates the range (size) of an image capturing area in the vertical direction. In the case described in step S502, the image capturing area ranges from the 0th line to the 1,075th line of the screen. The uppermost end of the range 605 is the 0th line. The lowermost end of the range 605 is the 1,075th line.

When displaying a projection image of the frame 403 on the panel of a projection plane, an image obtaining instruction is output at the timing 603 at which the display of the projection image is sequentially updated from the upper end line up to the lowermost line of the range 605, as shown in the display state 408. When image capturing starts at the timing 603, the period 601 is the exposure period for image capturing. During an exposure period, the display of the lines on the side lower than the lowermost line of the range 605 in the vertical direction is updated even during image capturing (the duration of the period 601), but the display of the lines on the side higher than the lowermost line in the vertical direction (the lines inside the range 605) is not updated. The same applies to a case in which a projection image of a next frame 404 is captured.

Figure 7:
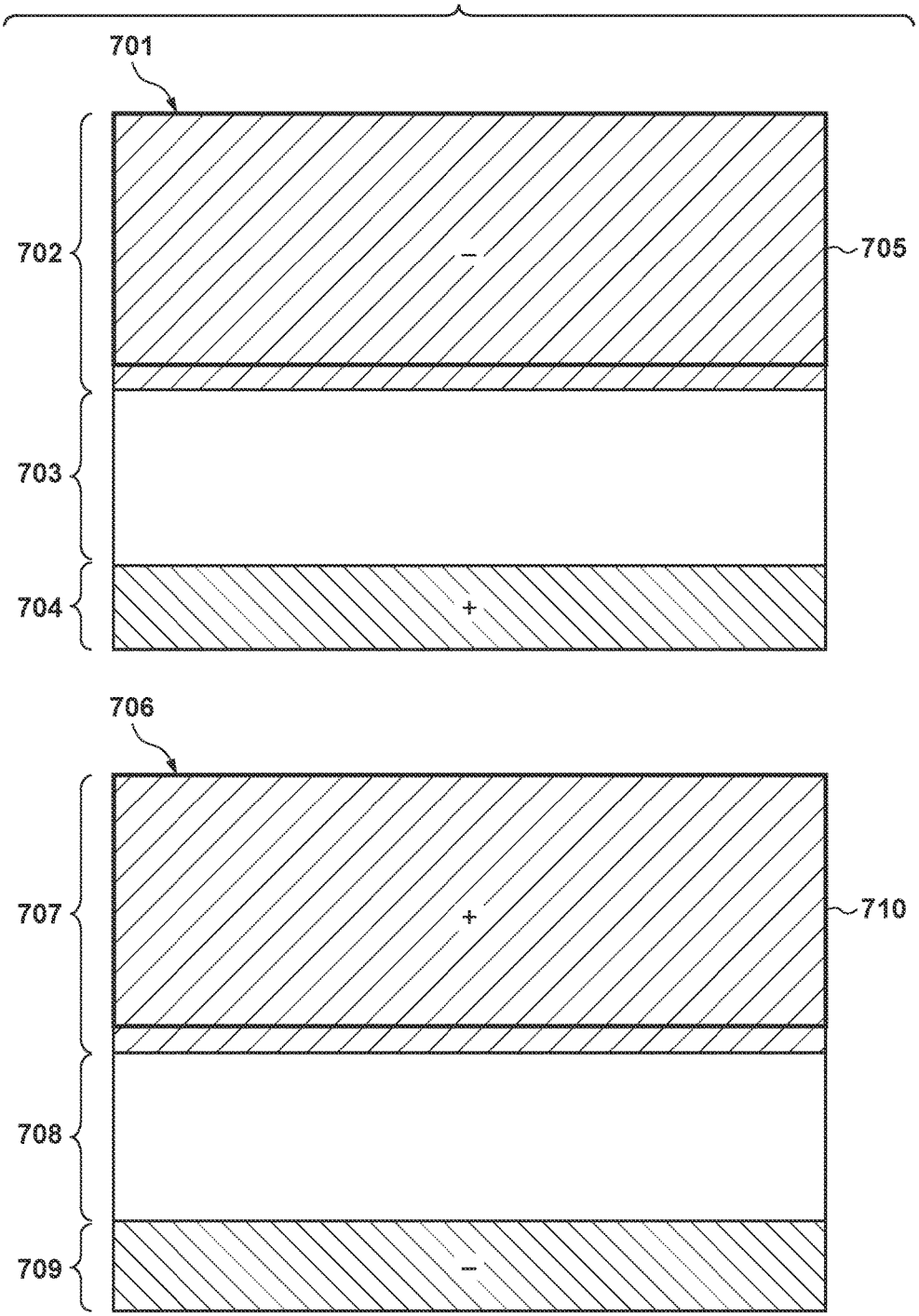
FIG. 7 is a conceptual view for explaining an obtained image according to the embodiment.

FIG. 7 is a conceptual view for explaining the captured images obtained in FIG. 6. A captured image 701 is an image obtained by starting image capturing at the timing 603. In addition, a captured image 706 is an image obtained by starting image capturing at the timing 604. The captured image obtained by the image obtaining unit 107 differs for each area depending on the presence/absence of a change in display during an exposure period, that is, the timing of the start of exposure.

An area 702 of the captured image 701 is an area where a projection image obtained by subtracting an invisible information pattern has been displayed for a longer period of time during an exposure period (in particular, an area 705 corresponds to an image capturing area, where no line is updated during an exposure period). An area 703 is an area where a projection image obtained by subtracting an invisible information pattern during an exposure period and a projection image (immediately preceding frame) obtained by adding an invisible information pattern during the exposure period have been displayed for almost the same period of time. The invisible information pattern cannot be detected from the obtained image. An area 704 is an area where a projection image (immediately preceding frame) obtained by adding an invisible information pattern during an exposure period has been displayed on the projection plane for a longer period of time.

Likewise, an area 707 of the captured image 706 is an area where a projection image obtained by adding an invisible information pattern has been displayed for a longer period of time during an exposure period has been displayed on the projection plane for a longer period of time (in particular, an area 710 corresponds to an image capturing area, where no line is updated during an exposure period). An area 708 is an area where a projection image (immediately preceding frame) obtained by subtracting an invisible information pattern during an exposure period and a projection image obtained by adding an invisible information pattern during the exposure period have been displayed for almost the same period of time. The invisible information pattern cannot be detected from the obtained image. An area 709 is an area where a projection image (immediately preceding frame) obtained by subtracting an invisible information pattern during an exposure period has been displayed on the projection plane for a longer period of time.

For the sake of simplicity in description, each image is divided into the following three areas:
1. the area 704 or 707 where a projection image obtained by adding an invisible information pattern has been displayed for a longer period of time on a projection plane;
2. the area 703 or 708 where a projection image obtained by subtracting an invisible information pattern and a projection image obtained by adding an invisible information pattern have been displayed for almost the same period of time; and
3. the area 702 or 709 where a projection image obtained by subtracting an invisible information pattern has been display for a longer period of time on a projection plane.

Note however that since these areas are determined depending on the display period of an invisible information pattern, the boundaries of the respective areas are not so clear as those of the areas shown in FIG. 7. In the case of the captured image 701, in the boundary from the area 702 to the area 703, the subtracted invisible information pattern is captured gradually sparsely and cannot be visually recognized in the area 703. In the boundary from the area 703 to the area 704, the added invisible information pattern is captured gradually densely.

The areas 705 and 710 respectively included in the areas 702 and 707 each indicates an image capturing area determined in step S502, where no change in display occurs during an exposure period. That is, in this area, only a projection image obtained by adding or subtracting an invisible information pattern during an exposure period is captured. The invisible information can be accurately extracted from these areas 705 and 710. In this embodiment, an image formed from only a dot pattern can be extracted by subtracting the image in the area 705 (the image from which the pattern is subtracted) from the image in the area 710 (the image to which the pattern is added). Upon completion of image capturing with the areas 705 and 710 being set as image capturing areas, the image capturing areas move to positions adjacent to the lowermost lines of the areas 705 and 710, and image capturing is performed. Performing image capturing a plurality of times in this manner will capture a one-frame image from which the pattern is subtracted and a one-frame image to which the pattern is added.

As described above, according to this embodiment, it is possible to accurately detect invisible information which cannot be visually recognized by the human eye and is added to a moving image from a captured image obtained by capturing the moving image. In addition, when performing such image capturing, a sufficient exposure period can be ensured.

Although the above embodiment has exemplified the arrangement configured to capture a projection image by using the projection apparatus, the present invention is not limited to a projection type image display apparatus. For example, it is obvious that the present invention can be applied to a case in which a predetermined pattern is extracted by capturing a display screen of a general display apparatus.

In addition, according to the above embodiment, synchronization signals (horizontal synchronization signals each for updating one line) for updating a one-frame portion are counted, and an image capturing start instruction is issued when obtaining a count value corresponding to the difference time obtained by subtracting an exposure period from a one-frame time. However, the present invention is not limited to this. Since it is only required not to perform updating during an exposure period in an area (an image capturing area in one frame) used for extracting a pattern from a captured image, image capturing may be started by a count value of synchronization signals corresponding to a time shorter than the difference time. In addition, in the above embodiment, when image capturing corresponding to the nth frame image capturing area is performed, image capturing corresponding to the (n+1)th frame image capturing area is performed first. Then, the image capturing area is moved to capture the (n+2)th frame and the (n+3)th frame. However, this is not exhaustive. For example, after image capturing corresponding to an image capturing area from the upper end line is performed with respect to the nth frame, the image capturing area may be moved to perform image capturing corresponding to the image capturing area after the movement. In any case, it is possible to ensure a longer exposure period than when using a vertical flyback period to obtain a one-frame captured image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-149810, filed Jul. 29, 2015, which is hereby incorporated by reference herein in its entirety.

What is claimed is:

1. A control apparatus comprising:
   one or more processors; and
   a memory having stored thereon instructions which, when executed by the one or more processors, cause the control apparatus to:
      acquire information concerning an update timing of a projection or display image;
      determine an image capturing timing by an image capturing unit based on the information concerning the update timing and an exposure period by the image capturing unit for capturing the projection or display image; and
      control a projection or display image based on a pattern image extracted from a captured image obtained by image capturing by the image capturing unit at the determined image capturing timing based on the information concerning the update timing and the exposure period by the image capturing unit for capturing the projection or display image,
   wherein an area in the projection or display image is specified based on the information concerning the update timing and information of the exposure period of the image capturing unit, and the image capturing timing is determined such that an image capture by the image capturing unit is performed during a period in which no update occurs in the specified area in the projection or display image, and
   wherein the instructions, when executed by the one or more processors, cause the control apparatus to determine a timing al which a lowermost end line of the specified area is updated as a timing to start capturing by the image capturing unit.

2. The control apparatus according to claim 1, wherein the instructions, when executed by the one or more processors, further cause the control apparatus to project an image.

3. The control apparatus according to claim 1, wherein the instructions, when executed by the one or more processors, further cause the control apparatus to change at least one of a shape and image quality of a projection or display image based on the pattern image extracted from a captured image based on an image capturing timing determined based on the information concerning the update timing and the information of the exposure period.

4. The control apparatus according to claim 1, wherein the information concerning the update timing comprises a horizontal synchronization signal associated with the projection or display image.

5. The control apparatus according to claim 1, wherein the instructions, when executed by the one or more processors, further cause the control apparatus to project or display the projection or display image, and
   wherein an image generated by adding the pattern image to an input image and an image generated by subtracting the pattern image from the input image are alternately projected or displayed.

6. The control apparatus according to claim 1, wherein the instructions, when executed by the one or more processors, further cause the control apparatus to determine the image capturing timing so as to make the image capturing unit perform image capturing in accordance with counting of the number of synchronization signals which corresponds to a time difference obtained by subtracting the exposure period from a one-frame period during which a one-frame image is projected or displayed.

7. The control apparatus according to claim 6, wherein the instructions, when executed by the one or more processors, further cause the control apparatus to generate the image capturing timing upon counting of the number of synchronization signals which corresponds to the time difference between two consecutive frames, and to generate the image capturing timing upon counting of the number of synchronization signals which corresponds to a time twice the time difference between next two consecutive frames.

8. The control apparatus according to claim 1, wherein the instructions, when executed by the one or more processors, further cause the control apparatus to generate the projection or display image by combining an input image with a predetermined image.

9. The control apparatus according to claim 8, wherein the predetermined image includes an image obtained by coding two-dimensional coordinate information.

10. The control apparatus according to claim 8, wherein the predetermined image includes an electronic watermark obtained by coding copyright information.

11. The control apparatus according to claim 9, wherein the instructions, when executed by the one or more processors, further cause the control apparatus to extract the predetermined image from the projection or display image included in the captured image by using an image in an area where no display content is updated during the exposure period of the image capturing unit.

12. A method of controlling a projection or display apparatus comprising:
  acquiring information concerning an update timing of a projection or display image;
  determining an image capturing timing by an image capturing unit based on the information concerning the update timing and an exposure period by the image capturing unit for capturing the projection or display image; and
  controlling a projection or display image based on a pattern image extracted from a captured image obtained by image capturing by the image capturing unit at the determined image capturing timing based on the information concerning the update timing and the exposure period by the image capturing unit for capturing the projection or display image,
  wherein, in the determining, an area is specified in the projection or display image based on the information concerning the update timing and information of the exposure period of the image capturing unit, and the image capturing timing is determined such that an image capture by the image capturing unit is performed during a period in which no update occurs in the specified area in the projection or display image, and
  wherein, in the determining, a timing at which a lowermost end line of the specified area is updated is determined as a timing to start capturing by the image capturing unit.

13. A non-transitory computer readable storage medium storing a program for causing a computer to execute a method of controlling a projection or display apparatus, the method comprising:
  acquiring information concerning an update timing of a projection or display image;
  determining an image capturing timing by an image capturing unit based on the information concerning the update timing and an exposure period by the image capturing unit for capturing the projection or display image; and
  controlling a projection or display image based on a pattern image extracted from a captured image obtained by image capturing by the image capturing unit at the determined image capturing timing based on the information concerning the update timing and the exposure period by the image capturing unit for capturing the projection or display image,
  wherein, in the determining, an area is specified in the projection or display image based on the information concerning the update timing and information of the exposure period of the image capturing unit, and the image capturing timing is determined such that an image capture by the image capturing unit is performed during a period in which no update occurs in the specified area in the projection or display image, and
  wherein, in the determining, a timing at which a lowermost end line of the specified area is updated is determined as a timing to start capturing by the image capturing unit.

14. The control apparatus according to claim 1, wherein the instructions, when executed by the one or more processors, cause the control apparatus to:
  determine the number of lines of a display image, to be updated within an exposure period of the image capturing unit based on the information concerning the update timing and the information of the exposure period of the image capturing unit;
  specify in the display image an area having a size corresponding to the number of remaining lines obtained by subtracting the number of lines to be updated from the number of effective lines constituting the display image; and
  determine the image capturing timing such that an image capture by the image capturing unit is performed during a period in which no update occurs in the specified area.

* * * * *